US012712390B1

(12) United States Patent
Nguyen

(10) Patent No.: US 12,712,390 B1
(45) Date of Patent: Aug. 18, 2026

(54) WIRELESS POWER TRANSFER SYSTEM FOR MARBLE GAME TOY

(71) Applicant: Don Tiendung Nguyen, Lowell, MA (US)

(72) Inventor: Don Tiendung Nguyen, Lowell, MA (US)

(*) Notice: Subject to any disclaimer, the term of this patent is extended or adjusted under 35 U.S.C. 154(b) by 0 days.

(21) Appl. No.: 19/545,681

(22) Filed: Feb. 20, 2026

(51) Int. Cl.
*H02J 50/10* (2016.01)
*A63F 7/36* (2006.01)
*A63F 7/40* (2006.01)

(52) U.S. Cl.
CPC ............ *H02J 50/10* (2016.02); *A63F 7/3622* (2013.01); *A63F 7/40* (2013.01); *A63F 2007/3662* (2013.01)

(58) Field of Classification Search
CPC ............ H02J 50/10; A63F 7/3622; A63F 7/40
See application file for complete search history.

(56) References Cited

U.S. PATENT DOCUMENTS

2018/0145539 A1* 5/2018 Page-Wood ............ H01F 38/14

* cited by examiner

*Primary Examiner* — Yingchuan Zhang

(57) ABSTRACT

A Wireless Power Transfer System for marble game toy is a plurality of marble game toy's elements comprising at least one wireless power transmitter element, referred to as the "Transmitter Element", and at least one wireless power receiver element, referred to as the "Receiver Element". The Transmitter Element, powered by an external power source, generates an oscillating electromagnetic field through a primary inductive coil, creating a "Transfer Zone" of electrical energy. The Receiver Element harvests the electrical energy using a secondary inductive coil via electromagnetic induction, converting it to electrical power for the electrical load. The Receiver Element comprises a battery-less "Functional Marble" that lights up when placed within the active Transfer Zone and "Functional Element" that, when placed within the active Transfer Zone and activated, performs user-perceptible functions comprising generating light effect, generating sound effect, generating motion effect, or any combination thereof.

4 Claims, 10 Drawing Sheets

1
2
3
4
5

7
6
8
9
10

7
6
8
9
10

40
42
41
44
47

40
48
47
41
44
43

44
47
46
48
45

6
41
41
42
42
43
43

6
40
47

WIRELESS POWER TRANSFER SYSTEM FOR MARBLE GAME TOY

FIELD OF INVENTION

The present disclosure addresses how the wireless power transfer technology can be deployed in the marble game toy, particularly a Wireless Power Transfer System enabling battery-less marble to light up and battery-less or wirelessly recharged accessories to perform user-perceptible functions.

BACKGROUND OF INVENTION

Marble game toy has been around for century. Marble game toy is generally a modular toy structure comprising a plurality of elements assembled together to form a pathway for marbles to roll down from the top of the structure to the bottom by their own gravity. Marble is herein defined as an object which is capable of rolling and therefore has spherical or oval shape. The elements of the marble game toys come in variety of shapes and sizes that allow the players to creatively assemble a marble run pathway to their own desire. Some of the most common elements in a modular marble game toy use ramps and tubular connectors as described in Wirth U.S. Pat. No. 3,946,516. The marble drops down through the connecting tube, rolls on the ramps and enters another connecting tube, traversing from the top of the course to the bottom. In the 1990s, the marble game toys were enhanced with the added complexity and features like obstacles to increase the time the marbles traverse the paths. These enhancements were disclosed in a series of patents including Wichman U.S. Pat. No. 4,713,038; Klitsner U.S. Pat. Nos. 4,874,342; 4,932,917 and 5,007,876; Wichman U.S. Design Pat. Nos. 290,026; 290,028; 290,143; 290,145; 293,696; 294,044 and 294,959; and Klitsner U.S. Design Pat. Nos. 305,042; 305,043; 305,044; 305,045; 305,046; 305,047; 305,345 and 305,443.

Today, some of the marble game toys' elements are electrified. An example is a motorized marble lift element that elevates the marbles back to the top of the pathway allowing continuous marble action. Other example is a battery-powered element that produces light and sound effects once a marble passes through using mechanical switch for detection. Recently, lighted marbles were introduced, each with a tiny, embedded button battery powering an embedded light-emitting diode (LED). These lighted marbles have short life span due to the battery draining out of power. Many users received these marbles dead on arrival (DOA)-batteries were already drained dead. Changing the battery compromises the marble's structure by breaking the shell; consequently, these marbles typically split open upon impact thereafter.

It is desirable to incorporate wireless power transfer technology to the marble game toy, enabling battery-less marble to light up and battery-less or wirelessly recharged accessories to perform user-perceptible functions.

Wireless power transfer is the transmission of electrical energy without any physical wire connection. In general, a wireless power transfer system consists of a transmitter device and one or more receiver devices. The transmitter device, powered by a power source, converts electrical energy into an oscillating electromagnetic field through a primary inductive coil made of coiled electrical wires. The receiver device uses a secondary inductive coil to harvest energy from the oscillating electromagnetic field via electromagnetic induction, converting it to AC or DC power for an electrical load such as light-emitting diodes (LEDs) or another electronic element. This technique is called inductive coupling and is the most widely used commercially-wireless phone charger is an example.

The energy transfer using inductive coupling technique is short range within the three-dimensional proximity of the transmitter device because the intensity of the oscillating electromagnetic field deceases exponentially as the distance between the transmitter device and the receiver device increases. This proximity range is relative and influenced by many factors. For instance, a transmitter device with higher power throughput creates stronger oscillating electromagnetic fields, which extend the transmission range. On the other hand, using the same transmitter device, a receiver device with a higher electrical load works only when closer to the transmitter compared to one with a lighter load. For illustrative purposes, the "Transfer Zone" is defined herein as the three-dimensional proximity where energy transmission is effective. Energy transmission is considered effective when the receiver device harvests sufficient energy to function as expected. The Transfer Zone is active when the transmitter device is activated.

U.S. Pat. No. 8,841,845 disclosed a wireless power system designed to provide power to a model display using a large wireless power transmitter as a mat placed under the model houses. This setup works for model houses of limited height and will unlikely work for a marble game toy where the game structure is often much higher. U.S. Pat. No. 11,857,890 disclosed a wireless power system for rechargeable interactive toys, mainly construction toys. U.S. Pat. No. 12,021,394 disclosed a contactless energy transfer system for construction toys. These disclosed setups require large sized primary inductive coils, making them impractical in term of size and power consumption for typical household toys. Furthermore, high-power requirement also poses safety hazard for children who are primary users of the marble game toys.

It is desirable to have a safe, compact Wireless Power Transfer System for the marble game toy, enabling battery-less marble that lights up when traversing through the active Transfer Zone and battery-less or wirelessly-recharged functional element that performs user-perceptible functions when placed within the active Transfer Zone.

SUMMARY OF INVENTION

The goal of the present disclosure is to provide a Wireless Power Transfer System for a commercially available marble game toy. Said Wireless Power Transfer System is a plurality of elements comprising at least one wireless power transmitter element, referred to as "Transmitter Element", and at least one wireless power receiver element, referred to as "Receiver Element". The Receiver Element further comprises battery-less "Functional Marble" that can light up and "Functional Element" that, when activated, performs user-perceptible functions comprising generating light effect, generating sound effect, generating motion effect, or any combination thereof.

Overview of the Marble Game Toy: To provide context, this section first outlines the basic prior art elements of the marble game toy. The marble game toy is an assembled structure from a plurality of elements to form a pathway for the marble to roll from the top of the structure to the bottom under the influence of gravity. There are many types of elements available commercially, but three prior art elements will be described here for the purpose of illustration. The first prior art element is an interconnect tube element that allows the marble to pass through, which has a cylindrical shape with one small end and one large end whereby one tube element can be securely mounted on top of another tube element. The interconnect tube element is herein referred to as the "Tube Element".

The second prior art element is a ram element which has an inclined ram connecting two adapted Tube Elements through the opening on the side of each adapted Tube Element. A marble comes down through the top of the first adapted Tube Element, exits through the opening on its side, rolls down the inclined ram to enter the second adapted Tube Element via its side opening and exits the bottom. This second prior art element is herein referred to as the "Ramp Element".

The third prior art element is a vortex funnel element designed to extend the traverse time of a marble by forcing it to orbit, spin, and loop like a whirlpool. The main feature of the vortex funnel element is a wide, hyperbolic shaped funnel with an exit hole at the center bottom and an inclined, curved ram connected to the upper, outer edge of the funnel. The upper end of the curved, inclined ram connects to an adapted Tube Element at a higher elevation so that a marble, entering the upper adapted Tube Element, speeds down the curved, inclined ram onto the outer edge of the funnel and continues to orbit the hyperbolic shaped surface until reaching the center exit hole. This third prior art element is herein referred to as the "Funnel Element".

The Basic of the Wireless Power Transfer System: Wireless power transfer is the transmission of electrical energy without any physical wire connection. In general, a wireless power transfer system consists of a transmitter device and one or more receiver devices. The transmitter device, powered by a power source, converts the electrical energy into an oscillating electromagnetic field through a primary inductive coil made of coiled electrical wire. The receiver device harvests energy from said oscillating electromagnetic field via a secondary inductive coil utilizing electromagnetic induction. The harvested energy is converted into AC or DC power to supply an electrical load, such as light-emitting diodes (LEDs) or another electronic element. This technique is called inductive coupling.

The energy transfer using inductive coupling technique is short range within the three-dimensional proximity of the transmitter device because the intensity of the oscillating electromagnetic field deceases exponentially as the distance between the transmitter device and the receiver device increases. The operating range of said proximity is relative, dependent on factors including power throughput and electrical load. For instance, a transmitter device with higher power throughput generates a stronger oscillating electromagnetic field, thereby extending its effective range. Conversely, a receiver device with higher electrical loads must operate closer to the transmitter device to ensure sufficient power, compared to that with lighter loads. The 'Transfer Zone' is herein defined as the relative three-dimensional proximity within which a transmitter device can effectively transfer energy to a receiver device. Energy transmission is considered effective when the receiver device harvests enough energy to function as expected.

The Disclosure: According to one aspect, the Wireless Power Transfer System is a plurality of elements comprising at least one Transmitter Element and at least one Receiver Element. When a Transmitter Element is activated, it wirelessly transfers the power to the Receiver Elements located within the Transfer Zone. The Transfer Zone is active when the Transmitter Element is activated. Said Receiver Element comprises battery-less Functional Marble that lights up when traversing within an active Transfer Zone and Functional Element that performs user-perceptible functions when activated within an active Transfer Zone.

According to the preferred embodiment, the Transmitter Element comprises a housing and a Transmitter Device disposed within the housing. Said housing has a dish shape and further comprises a coupling element allowing removable attachment to the elements of the marble game toy. Said Transmitter Device comprises a primary inductive coil made of coiled electrical wire, a transmitter circuit that drives said primary inductive coil to create an oscillating electromagnetic field, a power switch accessible from the outside of the housing to turn the Transmitter Device on and off, and a power connector accessible from the outside of the housing allowing an external power source cable to be plugged in. Said external power source comprises standard AC outlet adapter, USB, and batteries.

According to another preferred embodiment, the Functional Marble comprises a spherical or oval housing and a Receiver Device embedded within the housing. Said housing is preferably made of transparent or translucent plastic, comprising either two halves of a spherical or oval shell permanently fused together, or a solid spherical or oval body molded over the embedded Receiver Device. Said Receiver Device comprises a secondary inductive coil made of coiled electrical wire and a receiver circuit that transforms the energy harvested by the secondary inductive coil into AC or DC power. Said receiver circuit further comprises at least one light-emitted diode (LED) that consumes said power.

According to another embodiment, the Functional Element comprises a housing and at least one Receiver Device disposed within the housing. The Functional Element is an element of art; therefore, the housing has the shape or outlines of any object—for example, an oval or a butterfly. Said housing further comprises a coupling element allowing removable attachment to the elements of the marble game toy. Said Receiver Device comprises a secondary inductive coil made of coiled electrical wire and a receiver circuit that transforms the energy harvested by the secondary inductive coil into AC or DC power. Said receiver circuit further comprises at least one electronic element that consumes said power and performs user-perceptible functions.

According to another aspect, multiple Transmitter Elements can be used to enlarge the combined Transfer Zone which is the union of all active Transfer Zones.

BRIEF DESCRIPTION OF DRAWING

FIGS. 6A and B show the top perspective view and the bottom perspective view, respectively.

FIGS. 7A and B show the top perspective view and the bottom perspective view, respectively.

DETAILED DESCRIPTION OF THE INVENTION

The goal of the present disclosure is to provide a Wireless Power Transfer System for the commercially available marble game toy. To facilitate understanding, it is beneficial to begin with an overview of the marble game toy and its basic prior art elements.

Overview of the Marble Game Toy: Marble game toy is an assembled structure from a plurality of elements to form a pathway for the marble to roll from the top of the structure to the bottom under the influence of gravity. There are many types of elements available commercially that make up the marble game toy. Three most relevant elements (prior arts) will be described here for the purpose of illustration. The first prior art element is a Tube Element 1 shown in FIG. 1. Tube Element 1 has a cylindrical shape with one small end and one large end whereby one Tube Element can be securely mounted on top of another Tube Element. Multiple Tube Elements stacked on top of each other form a vertical channel for the marbles to pass through.

Figures 1, 2, 3A, 3B:
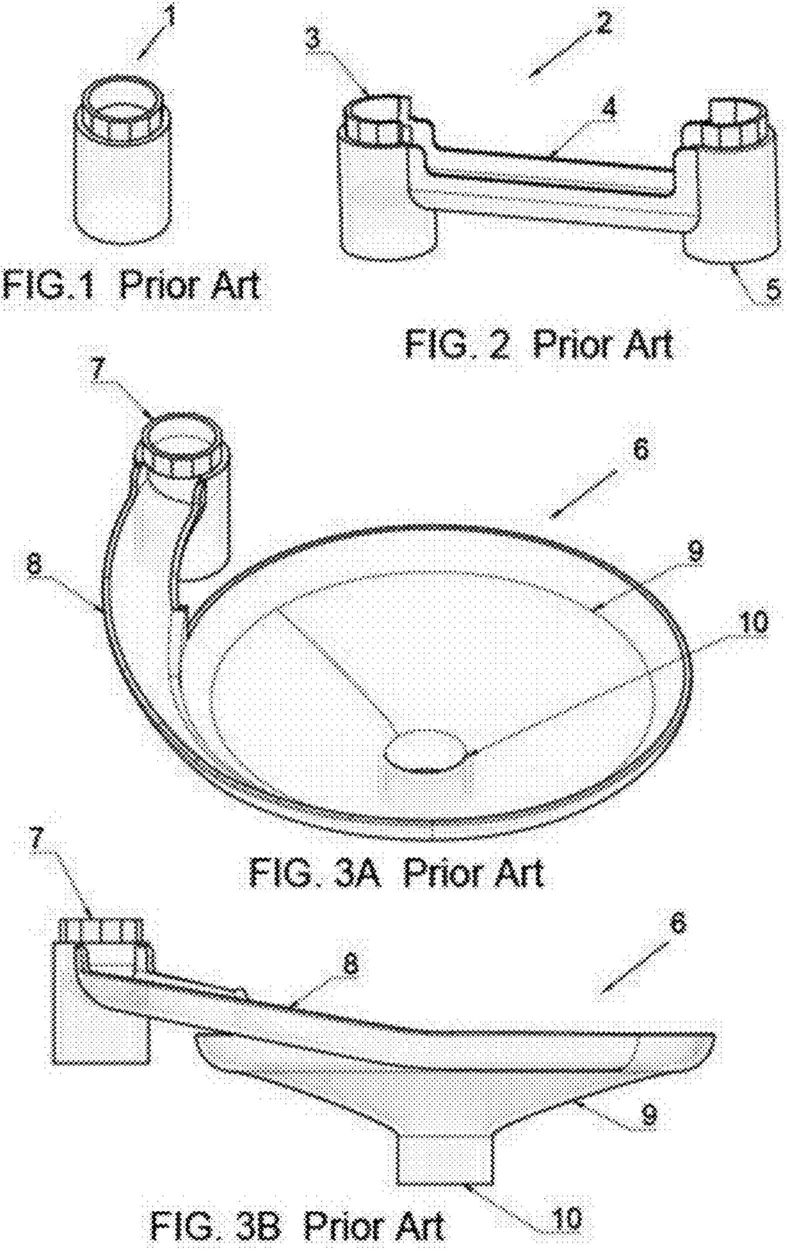
FIG. 1 shows a perspective view of a prior art Tube Element.
FIG. 2 shows a perspective view of a prior art Ram Element.
FIGS. 3A and B show a prior art Funnel Element, a perspective view and a front view, respectively.

The second prior art element is the Ram Element 2 shown in FIG. 2. Ram Element 2 is made of two adapted Tube Elements 3 and 5 connected together via an inclined ram 4, enabling a marble to switch from one vertical channel to another vertical channel. The marble enters the top of the adapted Tube Element 3, exits the side opening and rolls down the inclined ram 4 into the adapted Tube Element 5 via its side opening and exits through the bottom.

The third prior art element is the Funnel Element 6 shown in FIGS. 3A and 3B. FIG. 3A shows the perspective view while FIG. 3B shows the front view. The goal of the Funnel Element 6 is to extend the traverse time of a marble by forcing it to orbit, spin, and loop like a whirlpool in a hyperbolic shaped funnel 9. The marble enters the top of elevated adapted Tube Element 7, speeds down the curved, inclined ram 8, onto the upper, outer edge of the hyperbolic shaped funnel 9, and continues to orbit until reaching the exit hole 10 at the bottom.

Figure 4:
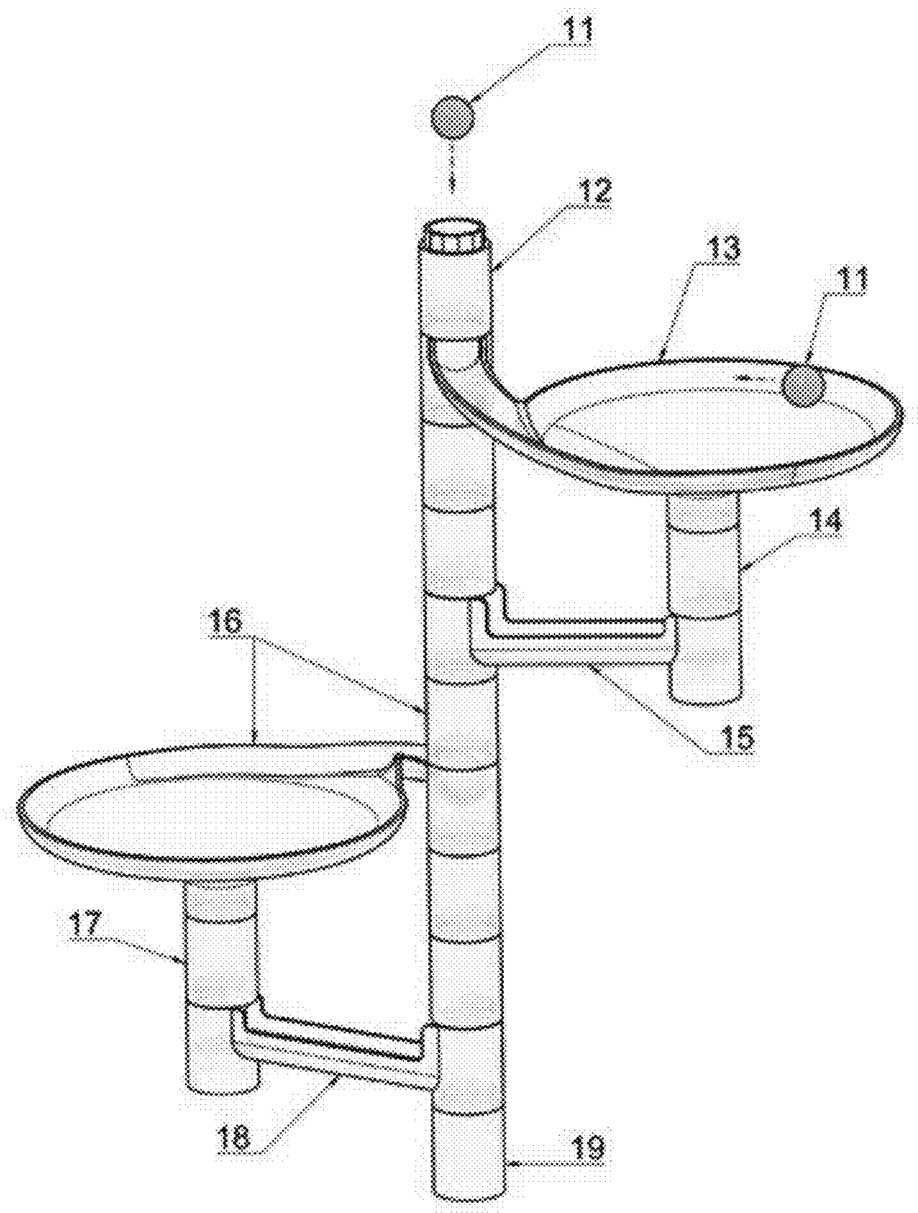
FIG. 4 shows an example of a marble game toy structure assembled with elements depicted in FIGS. 1, 2, 3A, and 3B. It illustrates a pathway that a marble would roll from the top of the structure to the bottom. This example of the marble game toy structure is also used for illustration in FIGS. 11 and 12.

FIG. 4 shows a sample of a marble game toy structure assembled from multiple Tube Elements 1, Ram Elements 2, and Funnel Elements 6. This setup defines a marble pathway as followed. A marble 11, enters the top of Tube Element 12, enters and orbits Funnel Element 13, passes through Tube Element 14, rolls through Ram Element 15, enters and orbits Funnel Element 16, passes through Tube Element 17, rolls through Ram Element 18, and finally exits through the bottom of Tube Element 19.

Figure 5:
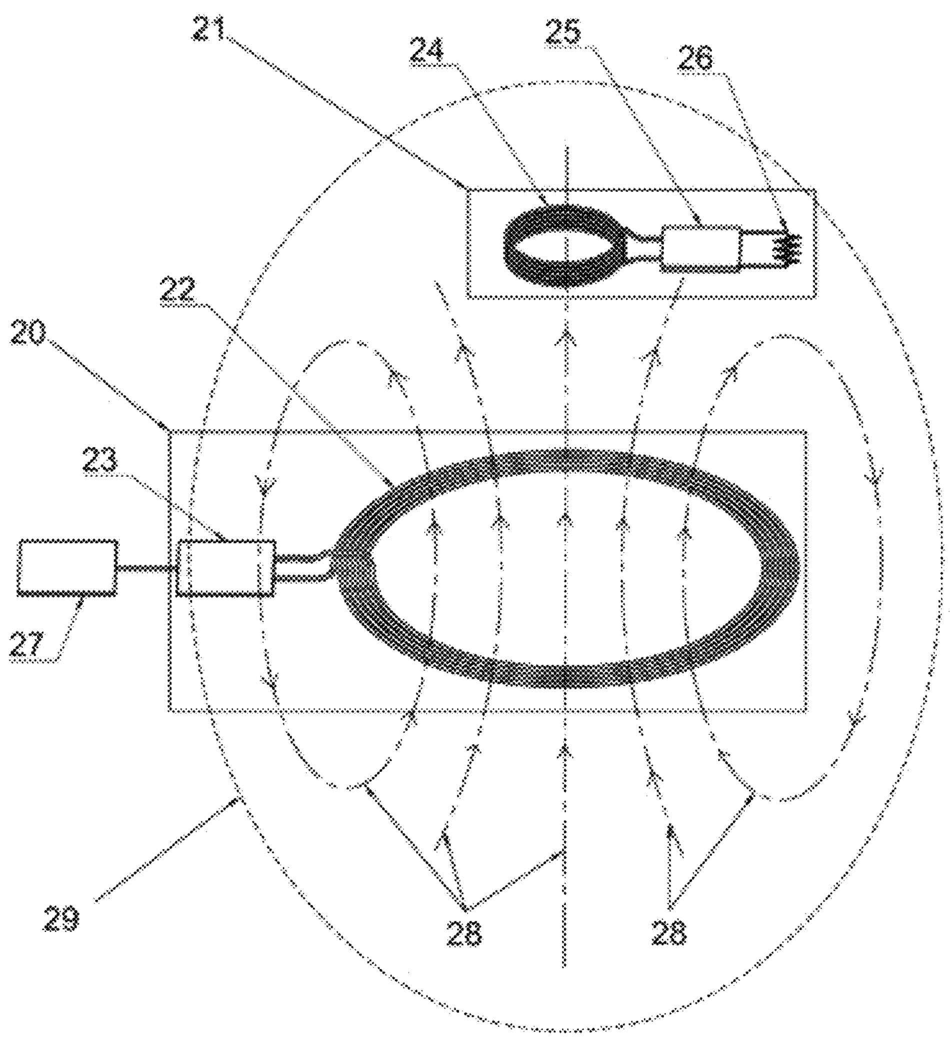
FIG. 5 illustrates diagrammatically a basic Wireless Power Transfer System.

The Fundamental of Wireless Power Transfer Technique: Wireless power transfer is the transmission of electrical energy without physical wire connection using inductive coupling technique. FIG. 5 illustrates diagrammatically a basic Wireless Power Transfer System with one Transmitter Device 20 and one Receiver Device 21. Said Transmitter Device 20, powered by an external power source 27, comprises a primary inductive coil 22 made of coiled electrical wire and a transmitter circuit 23 that drives the primary inductive coil 22 to create an oscillating electromagnetic field 28. Said Receiver Device 21 comprises a secondary inductive coil 24 and a receiver circuit 25 that transforms the energy harvested by the secondary inductive coil 24 from the oscillating electromagnetic field 28 into AC or DC power. The receiver circuit 25 further comprises an electrical load 26 that consumes said power. Said electrical load 26 comprises at least one light-emitting diode (LED) or another electronic element that performs user-perceptible functions when activated.

The energy transfer using inductive coupling technique is short range within the three-dimensional proximity of the Transmitter Device 20. The intensity of the oscillating electromagnetic field deceases exponentially as the distance between the Transmitter Device 20 and the Receiver Device 21 increases. The operating range of said proximity is relative, dependent on factors including power throughput and electrical load. For instance, a Transmitter Device 20 with higher power throughput generates a stronger oscillating electromagnetic field 28, thereby extending its effective range. Conversely, a Receiver Device 21 with higher electrical loads 26 must operate closer to the Transmitter Device 20 to ensure sufficient power, compared to that with lighter loads. The relative proximity that the Transmitter Device 20 can transfer the energy effectively to the Receiver Device 21 is referred to as the Transfer Zone 29. The Transfer Zone 29 is active when the Transmitter Device 20 is activated. The energy transmission is considered effective when the Receiver Device 21 harvests enough energy to function as expected.

The Disclosure: According to the first aspect, the Wireless Power Transfer System is a plurality of elements comprising at least one Transmitter Element and at least one Receiver Element. Said Transmitter Element, when activated, wirelessly transfers the power to the Receiver Elements located within the active Transfer Zone. The Transfer Zone is active when the Transmitter Element is activated. Said Receiver Element comprises:

a. Functional Marble that is battery-less but lights up when placed within the active Transfer Zone, and
b. Functional Element that, when located within the active Transfer Zone and activated, performs user-perceptible functions comprising generating light effect, generating sound effect, generating motion effect, or any combination thereof.

Figures 6A, 6B, 6C:
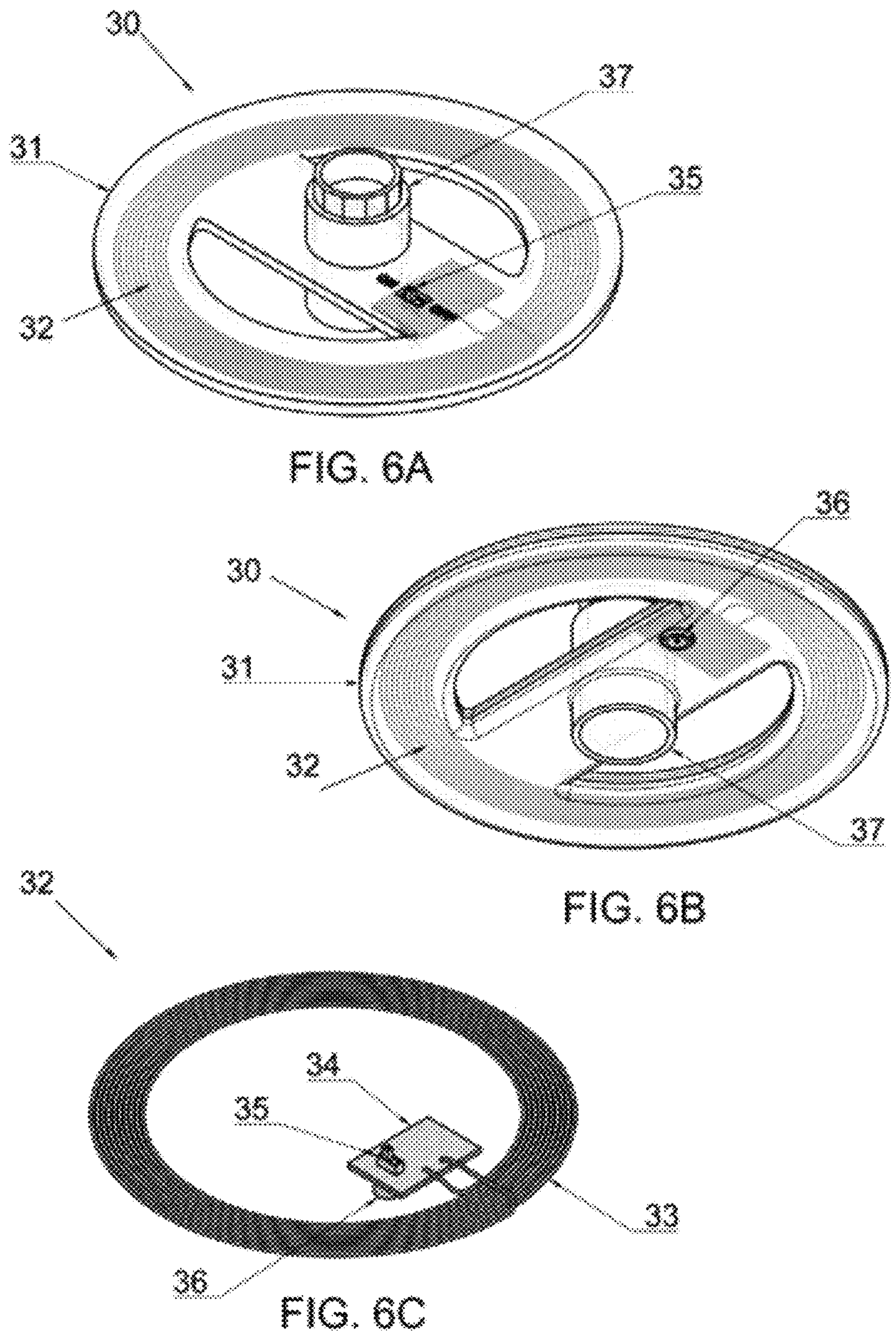
FIGS. 6A, B, and C show the preferred embodiment of the Transmitter Element.
FIG. 6C shows the internal Transmitter Device without the housing.

According to the preferred embodiment, the Transmitter Element 30 shown in FIGS. 6A and B comprises a housing 31 and a Transmitter Device 32 disposed within said housing. FIG. 6A shows the top perspective view and FIG. 6B shows the bottom perspective view. FIG. 6C removes the housing to show the internal Transmitter Device 32. The Transmitter Device 32 shown in FIG. 6C comprises a primary inductive coil 33, a transmitter circuit 34, a power switch 35 connected to the transmitter circuit 34 and is accessible from the outside of the housing 31 to turn the Transmitter Device 32 on and off, and a power connector 36 connected to the transmitter circuit and is accessible from the outside of the housing 31 to allow an external power cable to be plugged in. Said housing 31 is preferably made of plastic material and has a dish shape with an adapted Tube Element 37 at the center for removable attachment to the elements of the marble game toy. Said adapted Tube Element has a cylindrical shape with one small end and one large end whereby one Tube Element can be securely mounted on top of another Tube Element. While said adapted Tube Element has been described with respect to a cylindrical shape, it should be understood that other shapes, such as square or hexagonal, may be used in alternative embodiments.

Figures 7A, 7B, 7C, 7D, 7E:
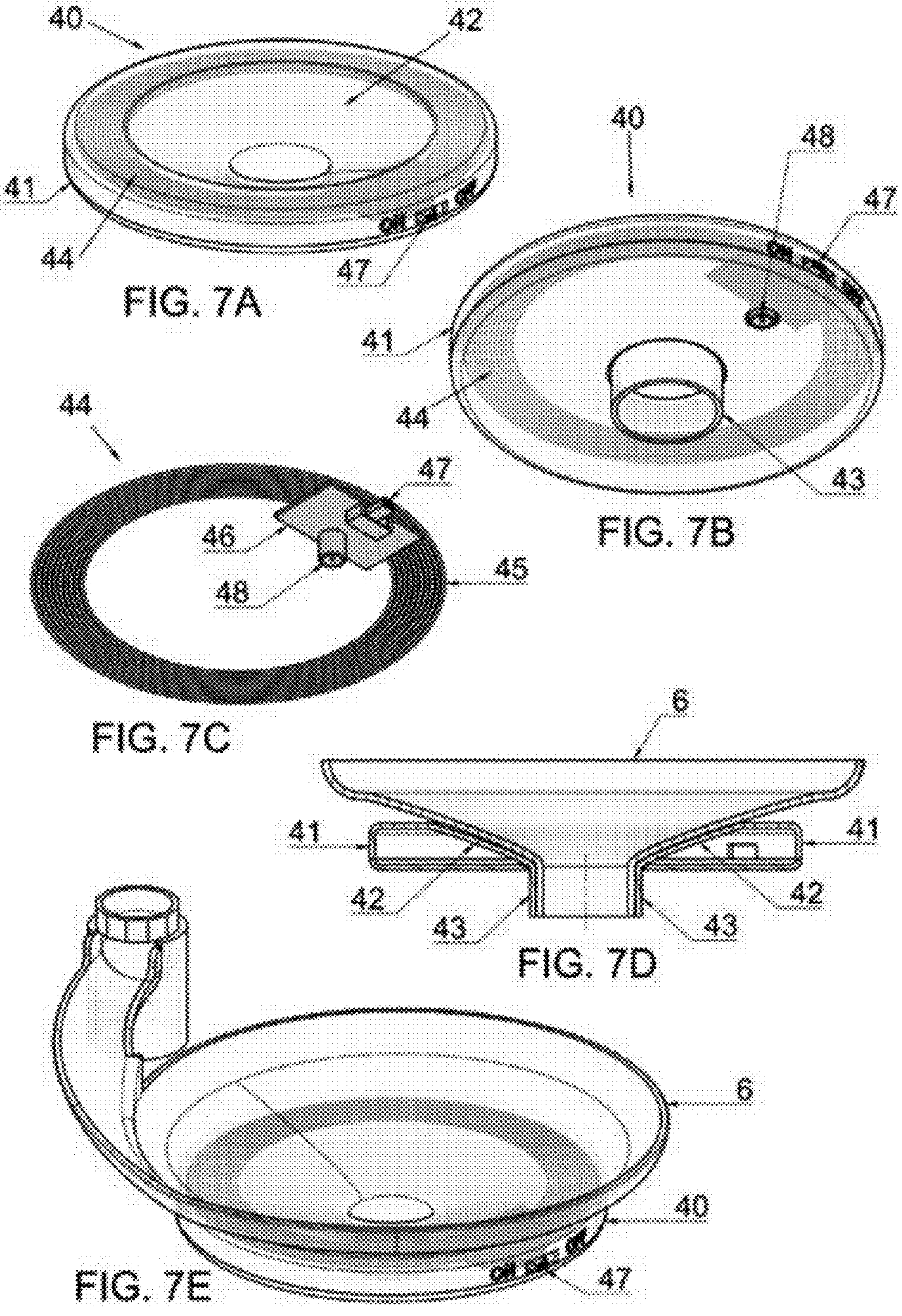
FIGS. 7A, B, C, D, and E show the alternative embodiment of the Transmitter Element that is to be mounted underneath a prior art Funnel Element.
FIG. 7C shows the bottom perspective view of the internal Transmitter Device without the housing.
FIG. 7D shows a cross section view of the Transmitter Element mounted underneath the prior art Funnel Element to show how the shape of the housing conforms to the shape of the prior art Funnel Element.
FIG. 7E shows a perspective view of the Transmitter Element mounted underneath the prior art Funnel Element.

FIGS. 7A and B show an alternative embodiment of the Transmitter Element 40, which is an adapted version of the Transmitter Element 30 illustrated in FIGS. 6A and B. FIG. 7A shows the top perspective view and FIG. 7B shows the bottom perspective view. The Transmitter Element 40 comprises the housing 41 and a Transmitter Device 44 disposed within the housing 41. FIG. 7D shows a cross section view of the housing 41 mounted below a prior art Funnel Element 6. The housing 41 comprises a funnel shaped top 42 and a center ring 43 that conform to the bottom shape of the prior art Funnel Element 6. The center ring 43 fits snugly and is used as the coupling element to other elements of the marble game toy. While said center ring has been described with respect to a circular ring shape, it should be understood that other shapes, such as square or hexagonal, may be used in alternative embodiments as long as the center ring can hold on to the prior art elements of the marble game toy. FIG. 7C shows bottom perspective view of the internal Transmitter Device 44 without the housing 41. The Transmitter Device 44 comprises a primary inductive coil 45, a transmitter circuit 46, a power switch 47, and a power connector 48. FIG. 7E shows a perspective view of the Transmitter Element 40 mounted below a prior art Funnel Element 6.

Figures 8A, 8B, 8C, 8D:
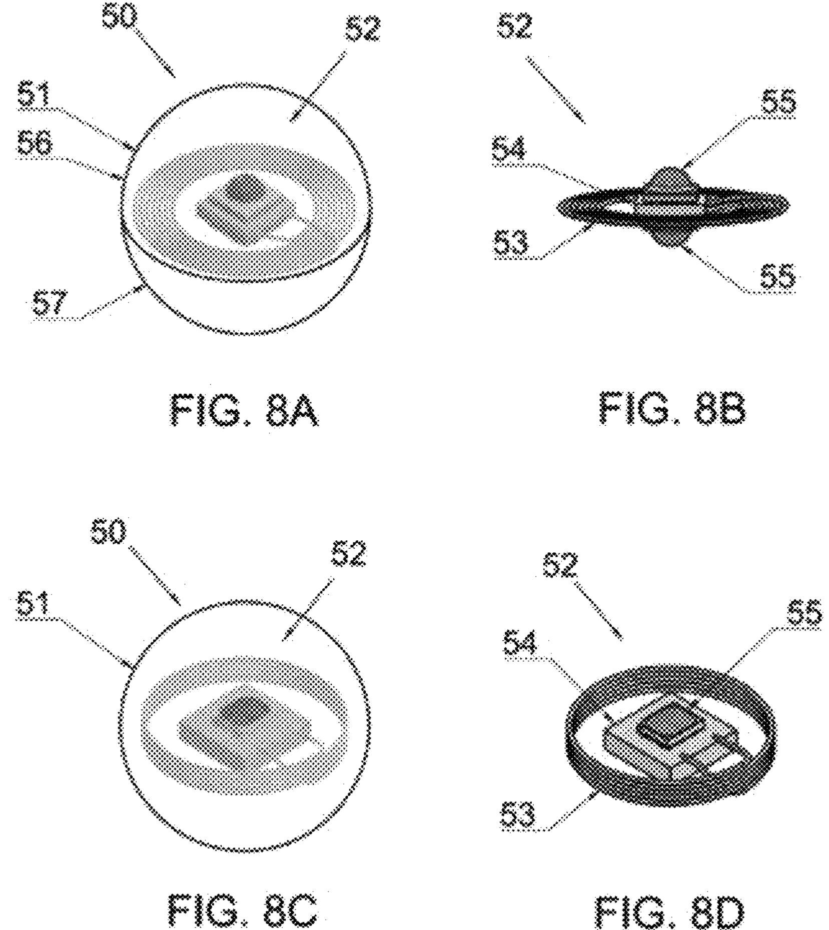
FIGS. 8A and B show one embodiment of the Functional Marble wherein the housing is made of two halves of a transparent or translucent spherical shell permanently fused together, and the embedded Receiver Device has two LEDs.
FIG. 8B shows the embedded Receiver Device without the housing.
FIGS. 8C and D show another embodiment of the Functional Marble wherein the housing is a solid body of transparent or translucent plastic over-molded the embedded Receiver Device. The embedded Receiver has one LED, demonstrating the flexibility of design.
FIG. 8D shows the embedded Receiver Device without the housing.

According to another preferred embodiment, the Functional Marble 50 shown in FIGS. 8A and C is a battery-less marble comprising a spherical housing 51 and a Receiver Device 52 embedded within the housing 51. The Receiver Device 52 shown in FIGS. 8B and D comprises a secondary inductive coil 53, a receiver circuit 54 with at least one light-emitting diode (LED) 55. When placed within an active Transfer Zone, the Receiver Device 52 harvests the electrical energy, convert it to electrical power, and lights up at least one LED 55. FIG. 8B shows the receiver circuit 54 with two LEDs 55. FIG. 8D shows the receiver circuit 54 with one LED 55. FIGS. 8B and D depict different types of the secondary inductive coils 53 and LEDs 55, illustrating that electronic component can come in different forms. The housing 51 is preferably made of transparent or translucent plastic and has a spherical or oval shape. The housing 51 either comprises two halves 56 and 57 of a spherical or oval shell permanently fused together securing the Receiver Device 52 inside (shown in FIG. 8A), or a single solid spherical body of plastic over molded the Receiver Device 52 (shown in FIG. 8C).

According to another embodiment, the Functional Element comprises a housing and at least one Receiver Device disposed within the housing. The Functional Element is an element of art; therefore, said housing has a shape of a chosen object or its outline. Said object comprises any geometric shapes such as oval, cube, polygons; any organic shapes such as butterfly, birds, insects, flowers, animals; any abstract shapes, or any combination thereof. Said housing further comprises a coupling element enabling removable attachment to elements of the marble game toy. Said coupling element comprises an adapted Tube Element that mates with the elements of the marble game toy, or a coupling ring that snugly fits around a Tube Element. Said adapted Tube Element has a cylindrical shape with one small end and one large end whereby one Tube Element can be securely mounted on top of another Tube Element. While said adapted Tube Element has been described with respect to a cylindrical shape, it should be understood that other shapes, such as square or hexagonal, may be used in alternative embodiments. Similarly, while said coupling ring has been described with respect to a circular ring shape, it should be understood that other shapes, such as square or hexagonal, may be used in alternative embodiments as long as the coupling ring fits on the prior art Tube Element of the marble game toy. Said Receiver Device comprises a secondary inductive coil made of coiled electrical wire and a receiver circuit that transforms the energy harvested by the secondary inductive coil into electrical power. Said receiver circuit further comprises another electronic element that consumes said power. Said electronic element, when activated, performs user-perceptible functions comprising generating light effect, generating sound effect, generating motion effect, or any combination thereof.

Figure 9A:
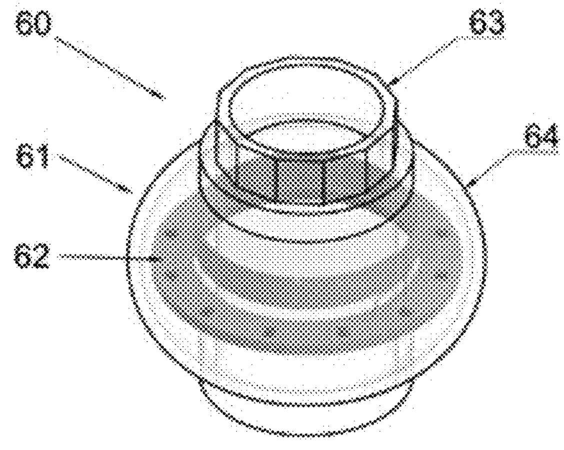
FIGS. 9A and B show one embodiment of the Function Element which has an oval shaped housing incorporating a coupling element of an adapted Tube Element for removable attachment to elements of the commercially available marble game toy.
Figure 9B:
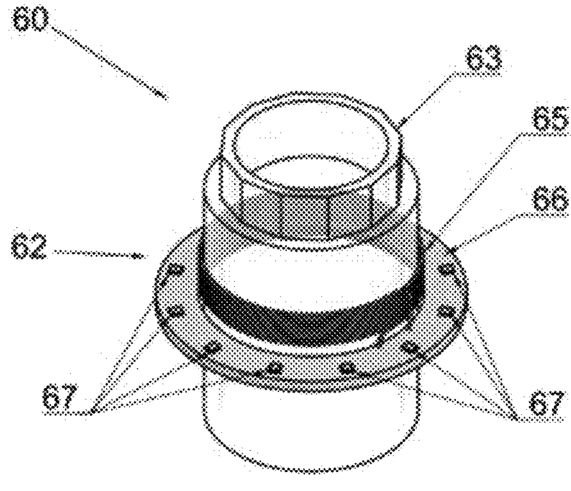
FIG. 9B removes the oval cover of the housing to show the internal Receiver Device.

FIG. 9A shows an example of a Functional Element 60 comprising a housing 61 a Receiver Device 62 disposed within the housing 61. The housing 61 comprises an oval shaped cover 64 wrapping around an adapted Tube Element 63 which serves as the coupling element enabling removable attachment to elements of the marble game toy. FIG. 9B depicts the Functional Element 60 with the oval cover 64 removed to show the internal Receiver Device 62. The Receiver Device 62 comprises a secondary inductive coil 65 wrapping around the adapted Tube Element 63 and a receiver circuit 66. Said receiver circuit 66 further comprises an electronic element that drives several light-emitting diodes (LEDs) 67. The Functional Element 60, when placed within an active Transfer Zone, activates a series of LEDs 67 in a predefined pattern.

Figures 10A, 10B, 10C:
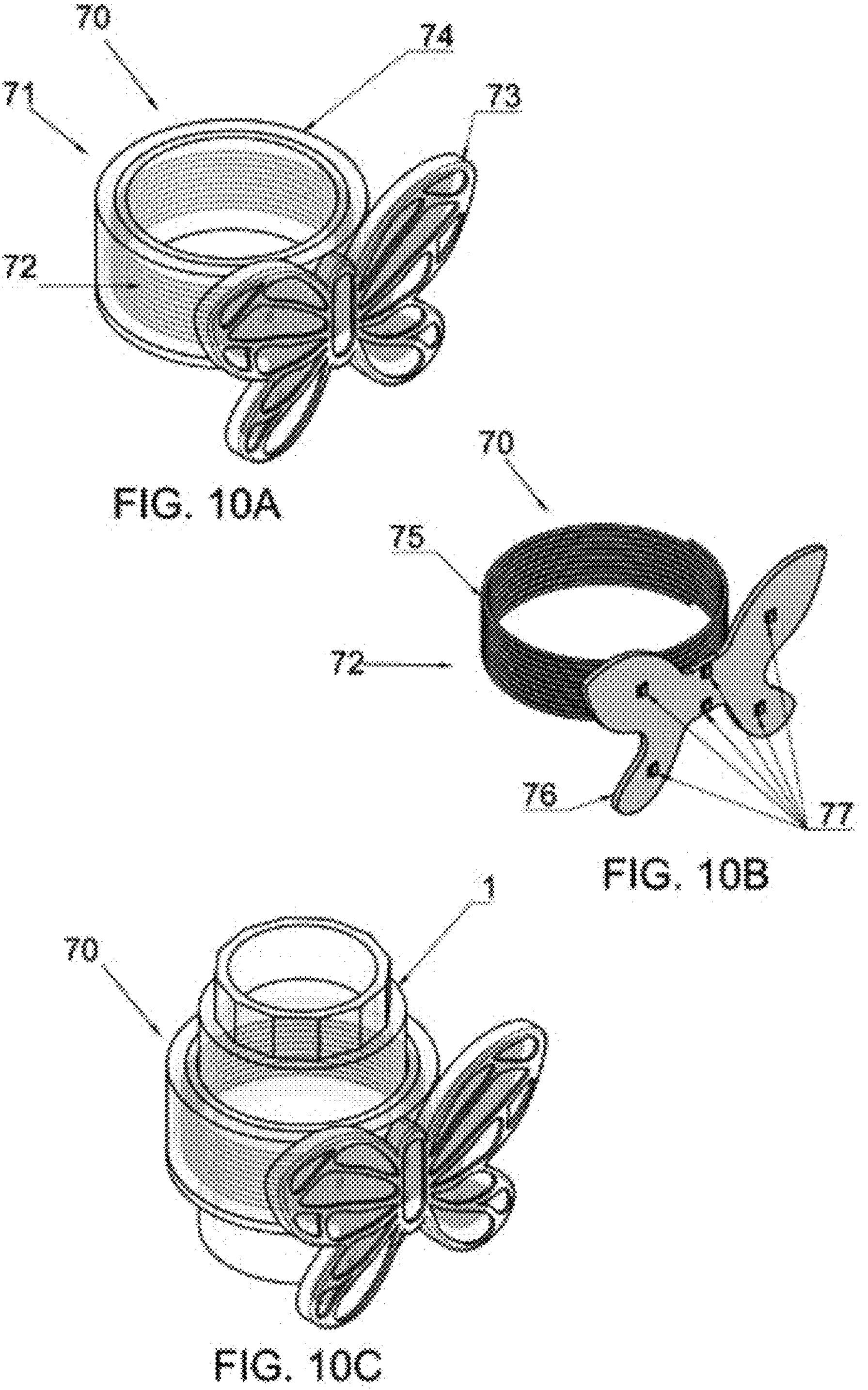
FIGS. 10A, B, and C show another embodiment of the Functional Element which has a butterfly shaped housing attached to a ring coupling element.
FIG. 10B shows the internal Receiver Device without the housing.
FIG. 10C shows the Functional Element mounted on a prior art Tube Element.

FIG. 10A shows another example of a Functional Element 70 that has a butterfly shape. The Functional Element 70 lights up the butterfly when placed within an active Transfer Zone. The Functional Element 70 comprises a housing 71 and a Receiver Device 72 disposed within the housing 71. The housing 71 comprises a butterfly shaped compartment 73 attached to a coupling ring 74. FIG. 10B depicts the Functional Element 70 without the housing 71 to show the internal Receiver Device 72. The Receiver Device 72 comprises a secondary inductive coil 75 embedded inside the ring 74 and a receiver circuit 76 which is a printed-circuit-board (PCB) of a shape of a butterfly outline. The receiver circuit 76 further comprises an electronic element that drives a series of light-emitting diodes (LEDs) 77. The Receiver Device 72, when placed within an active Transfer Zone, lights up the LEDs 77 in a predefined pattern. FIG. 10C illustrates how the Functional Element 70 is mounted on a prior art Tube Element 1 of the marble game toy.

According to another aspect, multiple Transmitter Elements are used in a marble game toy to provide an expanded Transfer Zone which is a union of all active Transfer Zones.

Figure 11:
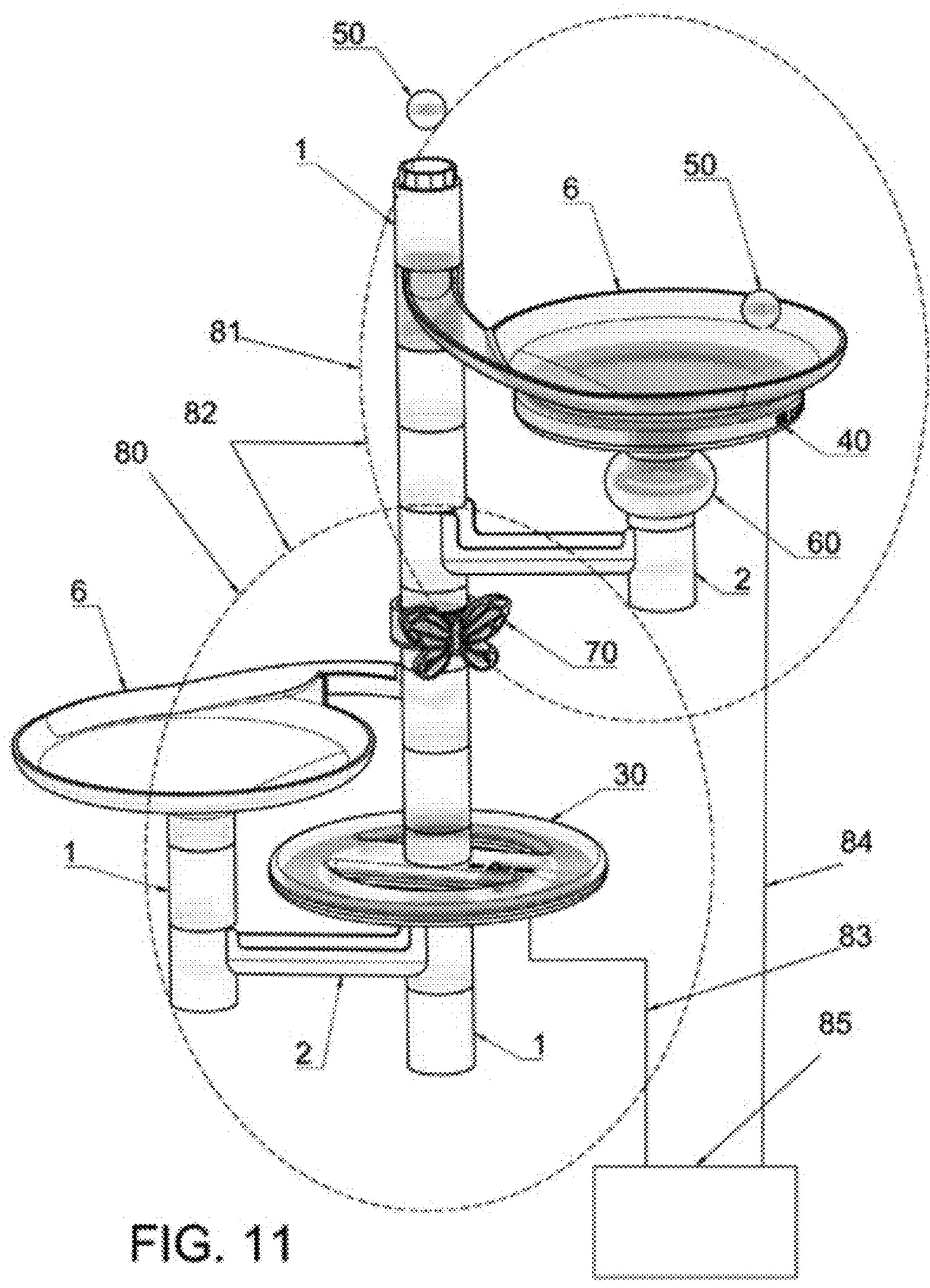
FIG. 11 shows the perspective view of an example of a marble game toy structure illustrating how the elements of the Wireless Power Transfer System are deployed.

FIG. 11 illustrates an example of a marble game toy where the elements of the Wireless Power Transfer System are deployed. The marble game toy structure is similar to that illustrated in FIG. 4. The resulting marble pathway is therefore similar to the one illustrated in FIG. 4. In this sample marble game toy structure, two Transmitter Elements are used. The Transmitter Element 30 replacing a Tube Element is powered by an external power source 85 via the power cable 83. When powered, the Transmitter Element 30 generates an active Transfer Zone 80. Another Transmitter Element 40 is attached underneath a prior art Funnel Element 6 and is powered by the external power source 85 via the power cable 84. When powered, the Transmitter Element 40 generates the active Transfer Zone 81. When both Transmitter Elements 30 and 40 are powered, the combined active Transfer Zone 82 is the union of the active Transfer Zone 80 and the active Transfer Zone 81. Two Functional Elements are also deployed in this marble game toy structure. The Functional Element 60 replaces a Tube Element right underneath the Transmitter Element 40 and is within the Transfer Zone 81. When Transmitter Element 40 is powered, the Functional Element 60 is activated and lights up in a predefined pattern. The other Functional Element 70 mounted on a prior art Tube Element at the center of the marble game toy structure and is within the Transfer Zone 80 of the Transmitter Element 30. When the Transmitter Element 30 is powered, the Functional Element 70 is energized and activated; the butterfly lights up in a predefined pattern. The Functional Marble 50 traverses the pathway from the top to the bottom and lights up when it is within the combined active Transfer Zone 82.

Figure 12:
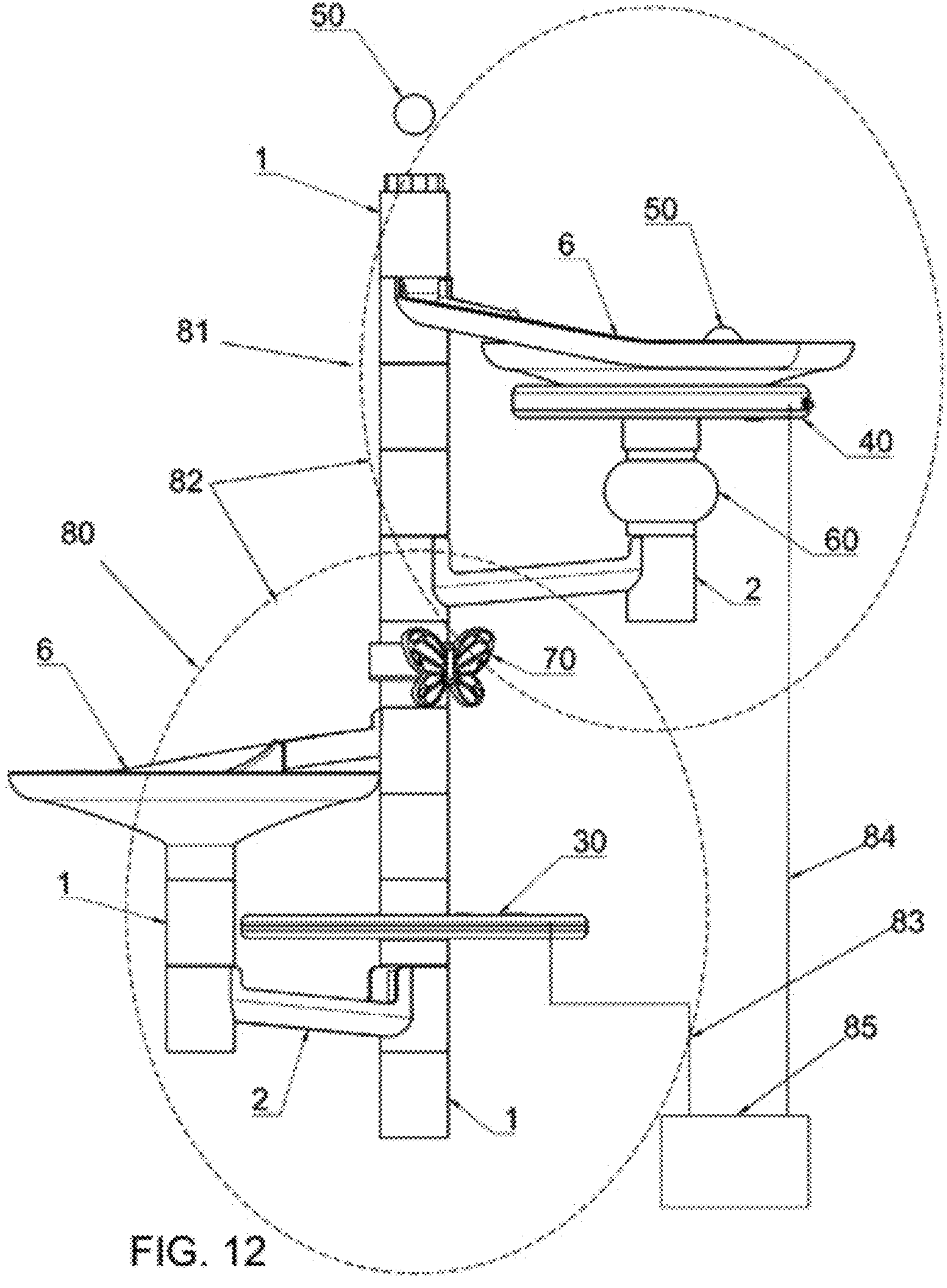
FIG. 12 shows a front view of the marble game toy structure illustrated in FIG. 11.

FIG. 12 provides a different angle view, the front view, of the same marble game toy structure shown in FIG. 11.

It should be emphasized that the term "comprises/comprising" when used in this specification is taken to specify the presence of stated features, elements, or components but does not preclude the presence or addition of other features, elements, or components thereof.

While the invention has been described in its preferred and alternative embodiments and illustrated in the drawings, such description is to be considered as exemplary and not restrictive in character. It is understood that changes and modifications that come within the scope of the invention are desired to be protected.

The invention claimed is:

1. A Wireless Power Transfer System adapted for use with commercially available marble game toy; wherein said Wireless Power Transfer System is a plurality of elements comprising at least one Transmitter Element and at least one Receiver Element;

wherein said Transmitter Element comprises a transmitter housing with coupling element to other elements of commercially available marble game toy and a Transmitter Device disposed within said transmitter housing; wherein said coupling element enables removable attachment to elements of the marble game toy; wherein said coupling element comprises an adapted tube element which has a cylindrical shape with one small end and one large end whereby one tube element can be securely mounted on top of another tube element, or a ring that fits snugly around the tube element of the marble game toy;

wherein said Transmitter Device comprises a primary inductive coil made of coiled electrical wire, a transmitter circuit that drives said primary inductive coil to create an oscillating electromagnetic field, a power switch accessible from the outside of said transmitter housing to turn said Transmitter Device on and off, and a power connector accessible from the outside of said transmitter housing allowing an external power source cable to be plugged in; wherein said Transmitter Device is powered by an external power source comprising standard AC outlet adapter, USB, or batteries; wherein said Transmitter Device, when powered, generates an active Transfer Zone of electrical energy via said oscillating electromagnetic field; and wherein said Receiver Element comprises a receiver housing and at least one Receiver Device disposed within said receiver housing; wherein said Receiver Device comprises a secondary inductive coil and a receiver circuit configured to convert energy induced in said secondary inductive coil by said oscillating electromagnetic field into electrical power; wherein said receiver circuit further comprises an electronic element that consumes said electrical power and performs user-perceptible functions comprising generating light effect, generating sound effect, generating motion effect, or any combination thereof.

2. The Wireless Power Transfer System of claim 1, wherein a first Receiver Element is a Functional Marble; wherein said Functional Marble comprises a Marble housing which has spherical or oval shape housing and a Marble Receiver Device embedded within the said Marble housing; wherein said Marble housing is preferably made of transparent or translucent plastic, comprising either two halves of a spherical or oval shell permanently fused together, or a solid spherical or oval body molded over the embedded Marble Receiver Device; wherein said Marble Receiver Device comprises a Marble secondary inductive coil and a Marble receiver circuit configured to convert energy induced in said Marble secondary inductive coil by said oscillating electromagnetic field into electrical power; wherein said Marble receiver circuit further comprises at least one light-emitting diode (LED); wherein, said Functional Marble is battery-less but lights up said LED when placed within said active Transfer Zone.

3. The Wireless Power Transfer System of claim 1, wherein a second Receiver Element is a Functional Element; wherein said Functional Element comprises a Functional housing and at least one Functional Receiver Device disposed within said Functional housing; wherein said Functional Receiver Device comprises a Functional secondary inductive coil and a Functional receiver circuit configured to convert energy induced in said Functional secondary inductive coil by said oscillating electromagnetic field into electrical power; wherein said Functional receiver circuit further comprises an electronic element that consumes said electrical power and performs user-perceptible functions comprising generating light effect, generating sound effect, generating motion effect, or any combination thereof; wherein said Functional housing has a shape of a chosen object comprising any geometric shapes, any organic shapes, any abstract shapes, or any combination thereof; wherein said Functional housing further comprises a coupling element enabling removable attachment to elements of the commercially available marble game toy; wherein said coupling element comprises an adapted tube element which has a cylindrical shape with one small end and one large end whereby one tube element can be securely mounted on top of another tube element, or a ring that fits snugly around the tube element of the marble game toy.

4. The Wireless Power Transfer System of claim 1, wherein more than one said Transmitter Elements are used to enlarge the combined Transfer Zone which is the union of all active Transfer Zones.

* * * * *